Jan. 23, 1968     P. BOUGHTON     3,365,564
ELECTRIC ARC WELDING
Filed July 29, 1965     3 Sheets-Sheet 1

Inventor
Peter Boughton
By Stevens, Davis, Miller & Mosher
Attorneys

Jan. 23, 1968  P. BOUGHTON  3,365,564
ELECTRIC ARC WELDING
Filed July 29, 1965  3 Sheets-Sheet 3

Inventor
Peter Boughton
By Stevens, Davis, Miller & Mosher
Attorneys

United States Patent Office 3,365,564
Patented Jan. 23, 1968

3,365,564
ELECTRIC ARC WELDING
Peter Boughton, St. Albans, England, assignor to The British Oxygen Company Limited, a company of Great Britain
Filed July 29, 1965, Ser. No. 475,698
Claims priority, application Great Britain, Aug. 6, 1964, 32,023/64
7 Claims. (Cl. 219—131)

ABSTRACT OF THE DISCLOSURE

In an electric arc welding apparatus of the type which comprises a welding electrode connected in parallel to a source of background level D.C. and to a source of D.C. pulses of predetermined amplitude and frequency, the arc is stabilized by including in series with it an inductance common to both current sources.

---

Figure 1:
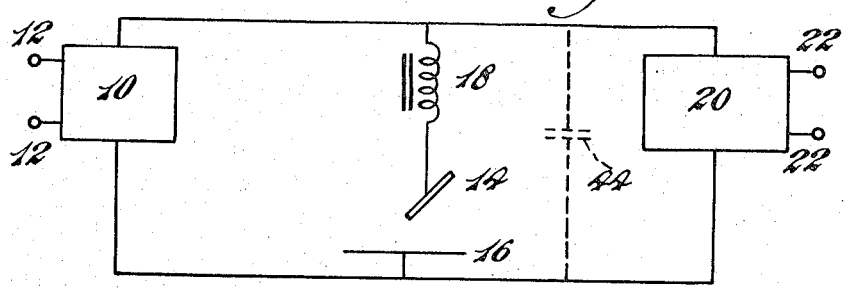
Figure 4:
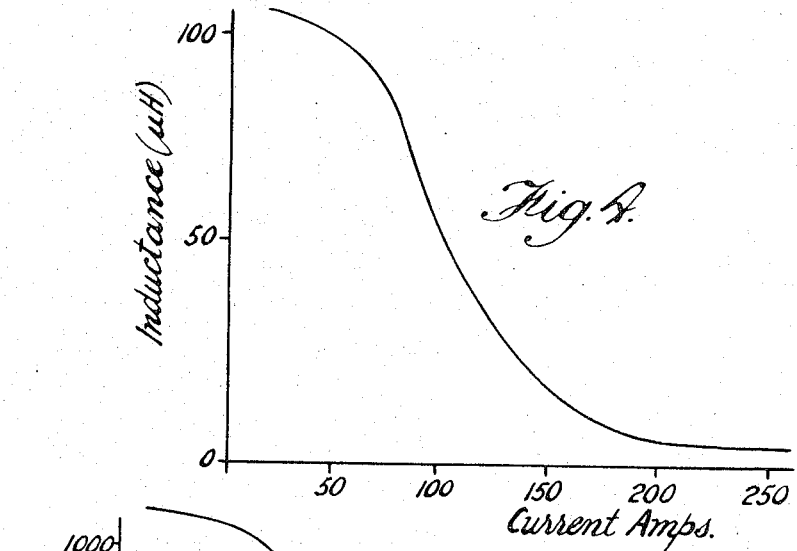

The present invention relates to consumable-electrode electric arc welding, which may be gas shielded, and particularly to power supplies therefor.

Recent work in this field has shown that great operational advantages can be achieved by modulating the welding current such that current pulses of controlled amplitude, duration, and frequency alternate with periods of relatively low (or background) current of the same polarity as the pulses. The combined effect of these two currents is to ensure that metal is transferred from the electrode in a much more controllable manner than previously obtainable. This welding current can be supplied from two power sources, e.g. a primary (or background) D.C. power supply of suitable output characteristics, and a secondary pulsed power supply. Examples of such advantages are: (i) the ability to work at lower mean welding currents than have been hitherto possible with free flight transfer, thereby keeping the weld pool at a temperature which is sufficiently low to facilitate working in positions other than the horizontal and yet ensure good fusion; (ii) the size of the metal droplet transferred can now be controlled; and (iii) the possibility of using lower average welding currents for a given wire size reduces the need to utilise very thin and costly electrode wires, thus reducing the problem of surface contamination which is particularly acute with fine wires of high surface:volume ratio.

Power supplies having sharply-drooping voltage-current characteristic have hitherto been considered essential for use as the background power supply, but we have found that for various reasons constant potential (i.e. flat) or shallow drooping V-A characteristic supplies are preferable. For example, such supplies are less costly and facilitate welding with the self-adjusting arc technique, as in conventional metal inert-gas shielded welding. A serious disadvantage of flat characteristic background power supplies is that when the background current is less than about 100 amperes the arc is unstable and liable to extinction to the extent that satisfactory welding cannot be accomplished.

It is an aim of the present invention to provide a welding power supply system in which undesired and transient fluctuations leading to arc instability are substantially reduced or eliminated. We have discovered that such fluctuations may occur, in the case of aluminium welding for example, as a result of metal transfer occurring during a period in which the arc current is of the same order as the transient fluctuation. It is believed that severe current transients are associated with detachment of droplets of weld metal of a droplet size larger than those encountered in conventional high current spray transfer.

In accordance with the invention, we provide an electric arc welding system including a primary DC power supply adapted to provide a relatively low current sufficient to maintain the arc between electrode and workpiece but not sufficient in itself to effect metal spray transfer across the arc and a secondary power supply adapted to provide unidirectional pulses of welding current of predetermined amplitude and frequency, the combined effect of these two power sources being to control the transfer of metal from the electrode to the workpiece, the primary and secondary power supplies being connected in parallel across the arc, in which the primary power supply is of the flat characteristic type and in which an inductance is provided in series with the arc to provide a voltage transient sufficient to prevent the welding current fluctuation from reaching a value at which the arc is unstable.

The present invention is believed to be of general application to systems in which the open circuit voltage of the background or primary power supply does not exceed the peak pulse voltage of the secondary or pulsed power supply, and by way of guidance and not limitation it can be said that the flat characteristic power supply herein referred to is one in which there is a terminal voltage of drop not more than 5 or 6 volts for a 100 ampere change in welding current.

According to an advantageous feature of the invention, the inductance is of a type which has a saturable magnetic path and which saturates at currents above a certain level of welding current, that is, the level of background welding current below which arc extinction is a practical and frequent problem and above which arc extinction occurs only very rarely if at all. By way of example, above about 80 amperes background current the welding arc is stable during pulsed arc welding and arc extinction never or only very rarely occurs. It is believed that some transient current fluctuations are associated with detachment of a metal droplet and its transfer across the arc by the agency of the applied pulse, and these fluctuations are believed to be of the order of 30–40 amps. When these fluctuations are near or equal to the value of the background current, the likelihood of the arc current momentarily reaching zero with consequent arc extinction is considerable.

The main advantage of employing a saturable inductance is that if its saturation level is chosen as aforesaid, then its impedance will be low at currents above about 80 amps. and in consequence the applied pulses will not be significantly attenuated, but the reactive "stored energy" characteristic of the inductance will be effective at currents below about 80 amps. to sustain the arc in the event of severe current fluctuations of the type discussed above. In this way a lower-output pulsed power supply can be employed than if the inductance was of the type having a relatively high impedance at the current level, e.g. 150–450 amperes, supplied by the pulsed power supply.

While the theoretical explanations given herein are believed correct, investigation of the phenomena which are of very short duration has been difficult, and the practical utility of the present invention is not dependent on any particular theory.

In addition to the provision of an inductance as aforesaid, one or more capacitors may be placed in parallel across the arc. The effect of such a capacitor is to assist in the switching from the pulsed to the background power supply, as its stored energy is available to increase the speed of rise of the current from the background supply to the normal background level. In some systems such a capacitor may not be necessary.

Figure 2A:
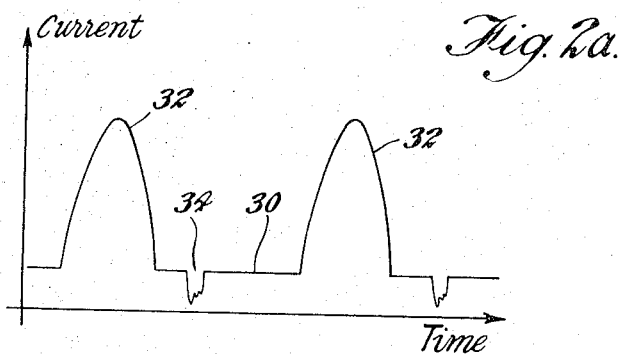
Figure 2B:
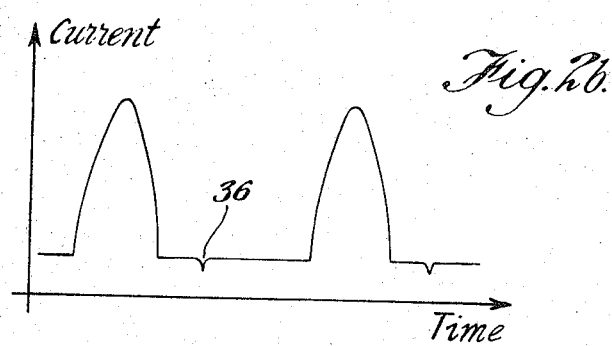
Figure 3A:
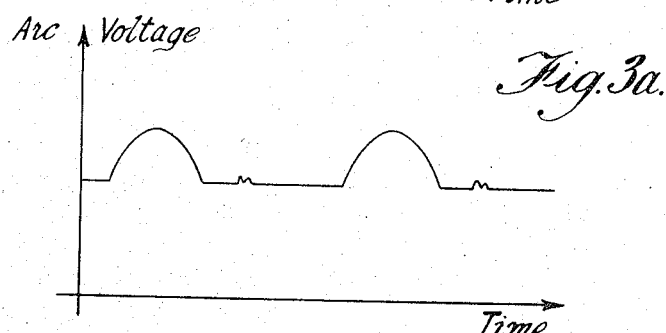
Figure 3B:
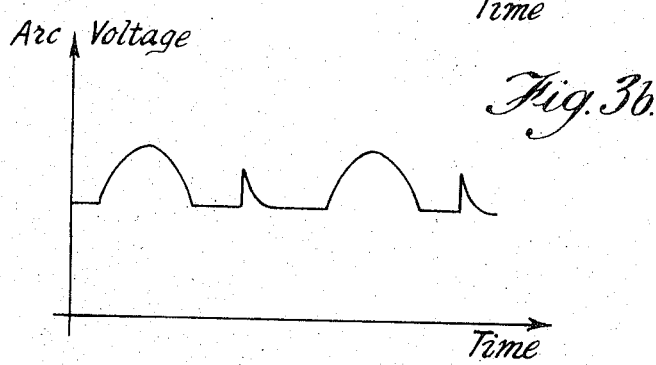

An illustrative embodiment of the present invention will now be particularly described with reference to the accompanying drawings, in which:

FIG. 1 is a schematic circuit diagram of a welding system according to the present invention, FIGS. 2a and 2b are graphs showing the arc current (ordinate) against time (abscissa) illustrating the improvement obtained with the present invention (FIG. 2b) compared to a system using a flat characteristic background supply and no inductance (FIG. 2a), FIGS. 3a and 3b are graphs showing the voltage applied across the arc against time, with FIGS. 3a and 3b corresponding to FIGS. 2a and 2b, FIGS. 4 and 5 are graphs showing the inductance-current characteristics of two illustrative inductances which can be used in the system of the present invention, and FIGS. 6a, 6b, 7a and 7b are graphs illustrating an advantageous aspect of the invention.

Figure 5:
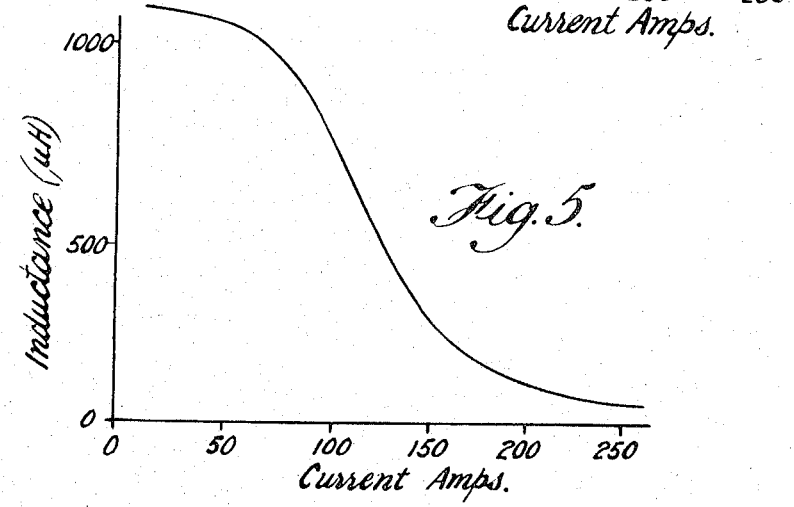

Referring to FIG. 1, the system comprises a primary power supply 10 connected by terminals 12 to 3-phase AC mains. The power supply 10 is of the type known per se having a flat or slightly drooping voltage-current characteristic, and is adapted to provide a relatively low current sufficient to maintain an arc between the consumable electrode (diagrammatically shown at 14 and a workpiece 16. An inductance 18 is placed in series with the arc and may take the form of an iron-cored choke with a small air gap. It can for example have an incremental value of 10–100 microhenries and the characteristics shown in FIG. 4, when the instantaneous current exceeds 150 amperes; and an incremental value of 100 to 1000 microhenries and a characteristic as shown in FIG. 5 when the instantaneous current is less than 150 amperes.

A secondary power supply 20 which provides pulses of welding current is connected in parallel with the primary power supply 10 across the series arrangement of the inductance 18 and the arc. The combined effect of the primary and secondary power supplies is to control the transfer of metal from the electrode to the workpiece, and by an appropriate choice of variables it can be arranged that one droplet of metal is transferred per pulse, with substantially no transfer being initiated between pulses. The power supply 20 may be fed from an AC source (e.g. mains) whose terminals are shown at 22, and the details of arrangement and operation of the power source 20 form no part of the novelty of the present invention. A power source such as that forming the subject matter of either of our co-pending patent applications Ser. Nos. 476,026 and 475,701 can advantageously be employed as the secondary power source 20.

One of the advantageous effects of the inductance 18 can be seen from FIGS. 2 and 3. FIG. 2a is a graph of welding current against time obtained utilising a circuit as shown in FIG. 1 but with inductance 18 omitted, and FIG. 2b is a corresponding graph with the inductance 18 included in the circuit. The DC level of the primary or background power supply 10 is indicated at 30, and pulses supplied by the secondary power supply 20 are shown at 32. Between the pulses from the secondary power supply 20, current transients 34 occur, and involve danger of extinction of the arc due to arc instability. As stated, it is believed that these may be associated with irregular droplet formation or possibly detachment, but assessment of the phenomenon has been experimentally difficult and the present invention is not dependent on any particular theory as to the origin or cause of such transients. FIGS. 3a and 3b show the voltage applied across the arc, and it will be seen that the presence of inductance 18 causes a positive voltage transient 40 (FIG. 3b) whose effect is to almost completely smooth out the current transient as seen at 36 (FIG. 2b).

Figure 6A:
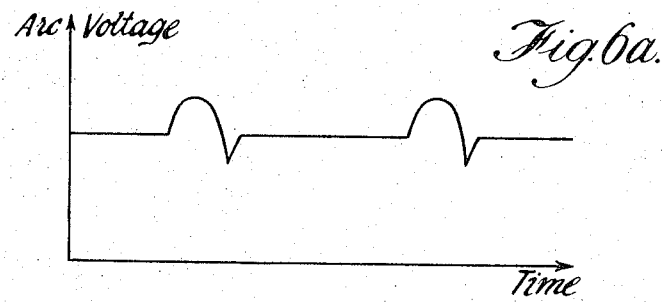
Figure 6B:
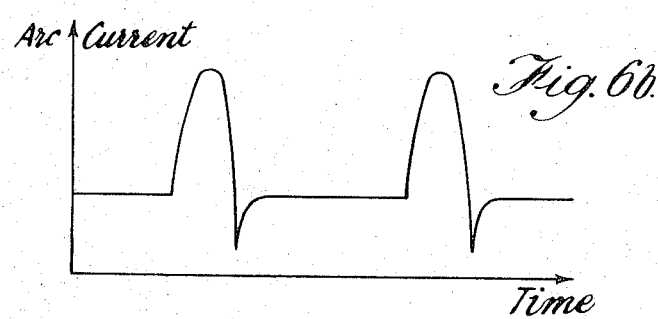
Figure 7A:
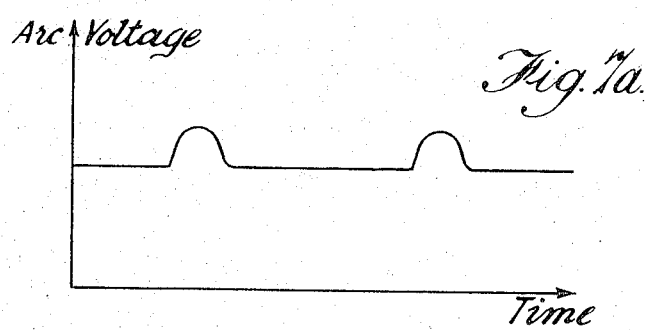
Figure 7B:
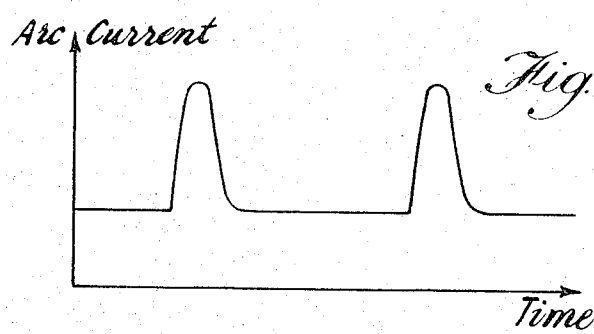

A further important advantage of the inclusion of an inductance in series with the arc is that switching from the condition when the arc is fed by the pulsed power supply and the background power supply in combination to the condition when it is fed by the background supply alone is greatly improved. Without the inductance the arc voltage and arc current graphed against time are as shown in FIGS. 6a and 6b respectively, and with an inductance included in series with the arc, the arc voltage and current against time are as shown in FIGS. 7a and 7b respectively. In FIG. 6 it can be seen that a sag in voltage 50 and in current 52 occurs immediately after the pulsed power supply is switched off, and in certain circumstances, for example when welding aluminium with a background current of only about 40–50 amps, this sag results in zero or near zero arc current with consequent arc extinction. The improved characteristic afforded by the present invention is shown in FIGS. 7a and 7b from which it can be seen that the stored energy of the inductance has greatly smoothed out the commutation from pulsed to background supply.

It will be understood from the foregoing that the background power supply is of the rectifier type or has a blocking rectifier in its output if it is of the generator or battery type. If it did not, then the arc voltage could never exceed the open-circuit voltage of the background power supply by anything more than a negligible amount, the impedance of the background supply being by definition very low since it is of the flat characteristic type.

As mentioned, an optional feature of the invention is the provision of one or more capacitors in parallel across the arc, and such a capacitor is shown dotted at 44 in FIG. 1. A suitable value for such a capacitor is 10,000 microfarads.

Specific examples of consumable electrode arc welding in accordance with the invention and using a 50 cycle per second mains supply are as follows:

| | Ex. 1 | Ex. 2 | Ex. 3 |
|---|---|---|---|
| Position | Overhead | Vertical | Horizontal-Vertical. |
| Workpiece | Aluminium Butt weld 0.125" thick. | Mild Steel Butt weld 1.15" thick. | Stainless Steel Fillet weld 0.61" thick. |
| Electrode composition | Aluminium | Mild steel | Stainless steel. |
| Diameter | .062 | .047 | .031. |
| Feed rate | 90 in./min | 80–140 in./min | 130 in./min. |
| "Stick out" | 0.6"/0.75" | 0.25" | 0.5". |
| Polarity | Positive | Positive | Positive. |
| Shielding gas | Argon | Argon + 2% oxygen | Argon + 2% oxygen. |
| Gas flow rate | 25/30 cu. ft./hr | 25/30 cu. ft./hr | 25/30 cu. ft /hr. |
| Background power supply type | 3 phase, rectified output, constant potential. | As Ex. 1 | As Ex. 1. |
| Pulse power supply type | Single phase, half and full wave rectified to give 50 c./s. and 100 c./s. pulses respectively. | As Ex. 1 | As Ex. 1. |
| Inductance in series with arc | Unsaturated 1,000 μH (at 10A) Saturated 20 μH. (at 150A). | As Ex. 1 | As Ex. 1. |
| Pulse frequency | 50 c./s | 50 c./s | 50 c./s. |
| Pulse voltage | 22 v | 27 v | 23 v. |
| Pulse current | 250 a | 330 a | 200 a. |
| Background voltage | 17.5 v | 14–19.5 v | 16 v. |
| Background current | 15 a | 10–80 a | 30 a. |

The invention is applicable to consumable electrode welding using solid wire electrodes and also composite electrode wires having a coating or a core of flux material.

I claim:

1. An electric arc welding apparatus comprising a primary D.C. power supply of the flat characteristic type adapted to provide a relatively low current sufficient to maintain the arc between electrode and workpiece but not sufficient in itself to effect metal spray transfer across the arc, a secondary power supply in parallel across the arc with the primary power supply and adapted to provide unidirectional pulses of welding current of predetermined amplitude and frequency, the combined effect of these two power sources being to control the transfer of metal from the electrode to the workpiece, and an inductance in series with the arc and with each power supply, the inductance being of a value to provide a voltage transient sufficient to prevent the welding current fluctuation from reaching a value at which the arc is unstable.

2. An electric arc welding apparatus comprising a primary D.C. power supply of the flat characteristic type adapted to provide a relatively low current sufficient to maintain the arc between electrode and workpiece but not sufficient in itself to effect metal spray transfer across the arc, a secondary power supply in parallel across the arc with the primary power supply and adapted to provide unidirectional pulses of welding current of predetermined amplitude and frequency, the combined effect of these two power sources being to control the transfer of metal from the electrode to the workpiece, an inductance in series with the arc and with each power supply, the inductance being of a value to provide a voltage transient sufficient to prevent the welding current fluctuation from reaching a value at which the arc is unstable, and a capacitor connected in parallel with the series connected welding arc and inductance.

3. An electric arc welding apparatus comprising a primary D.C. power supply of the flat characteristic type adapted to provide a primary D.C. power supply of the flat characteristic type adapted to provide a relatively low current sufficient to maintain the arc between electrode and workpiece but not sufficient in itself to effect metal spray transfer across the arc, a secondary power supply in parallel across the arc with the primary power supply and adapted to provide unidirectional pulses of welding current of predetermined amplitude and frequency, the combined effect of these two power sources being to control the transfer of metal from the electrode to the workpiece, an inductance of incremental value of 10–100 microhenries when the instantaneous welding current exceeds 150 amperes in series with the arc and with each power supply, the inductance being of a value to provide a voltage transient sufficient to prevent the welding current fluctuation from reaching a value at which the arc is unstable.

4. An electric arc welding apparatus comprising a primary D.C. power supply of the flat characteristic type adapted to provide a relatively low current sufficient to maintain the arc between electrode and workpiece but not sufficient in itself to effect metal spray transfer across the arc, a secondary power supply in parallel across the arc with the primary power supply and adapted to provide unidirectional pulses of welding current of predetermined amplitude and frequency, the combined effect of these two power sources being to control the transfer of metal from the electrode to the workpiece, and an inductance of incremental value of 100–1000 microhenries when the instantaneous welding current is less than 150 amperes in series with the arc and with each power supply, the inductance being of a value to provide a voltage transient sufficient to prevent the welding current fluctuation from reaching a value at which the arc is unstable.

5. An electric arc welding apparatus comprising a primary D.C. power supply of the flat characteristic type having a terminal voltage drop of not more than 6 volts for a 100 ampere change in welding current, the primary power supply being adapted to provide a relatively low current sufficient to maintain the arc between electrode and workpiece but not sufficient in itself to effect metal spray transfer across the arc, a secondary power supply in parallel across the arc with the primary power supply and adapted to provide unidirectional pulses of welding current of predetermined amplitude and frequency, the combined effect of these two power sources being to control the transfer of metal from the electrode to the workpiece, and an inductance having a saturable magnetic path in series with the arc and with each power supply, the inductance being of a value to provide a voltage transient sufficient to prevent the welding current fluctuation from reaching a value at which the arc is unstable.

6. An electric arc welding apparatus comprising a primary D.C. power supply of the flat characteristic type having a terminal voltage drop of not more than 5 volts for a 100 ampere change in welding current, the primary power supply being adapted to provide a relatively low current sufficient to maintain the arc between electrode and workpiece but not sufficient in itself to effect metal spray transfer across the arc, a secondary power supply in parallel across the arc with the primary power supply and adapted to provide unidirectional pulses of welding current of predetermined amplitude and frequency, the combined effect of these two power sources being to control the transfer of metal from the electrode to the workpiece, and an inductance in the form of an iron-cored choke with a small air gap in series with the arc and with each power supply, the inductance being of a value to provide a voltage transient sufficient to prevent the welding current fluctuation from reaching a value at which the arc is unstable.

7. A method of electric arc welding including the steps of feeding a continuous wire electrode to a welding arc established between its tip and a workpiece, shielding the arc from the atmosphere by a gas shroud, connecting to the welding arc a flat characteristic power supply including a rectifier in its output and adapted to supply a continuous unidirectional background current to the welding arc, connecting to the welding arc in parallel with the flat characteristic power supply a pulse power supply adapted to supply pulses of welding current to the welding arc to effect controlled transfer of electrode metal across the welding arc, the pulse voltage exceeding the background voltage during said current pulses and reverse biassing said rectifier to prevent passage of background current except between said current pulses, and connecting an inductance in series with the welding arc, the series-connected welding arc and inductance being connected across both power supplies, to substantially mitigate or eliminate arc instability.

References Cited
UNITED STATES PATENTS

| | | | |
|---|---|---|---|
| 2,777,973 | 1/1957 | Steele et al. | 315—171 |
| 2,993,984 | 7/1961 | Sullivan | 219—131 |
| 3,249,735 | 5/1966 | Needham | 219—131 |
| 3,308,265 | 3/1967 | Hobart | 219—131 |

RICHARD M. WOOD, *Primary Examiner.*